United States Patent
Campana et al.

(10) Patent No.: US 8,027,270 B1
(45) Date of Patent: *Sep. 27, 2011

(54) METHODS AND APPARATUS FOR BREAKING AND RESYNCHRONIZING A DATA LINK

(75) Inventors: Francis Campana, Milpitas, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,171

(22) Filed: Apr. 21, 2010

Related U.S. Application Data

(63) Continuation of application No. 10/658,666, filed on Sep. 9, 2003, now Pat. No. 7,706,295.

(51) Int. Cl.
*G01R 31/08* (2006.01)
(52) U.S. Cl. .......................... 370/252; 370/445; 714/42
(58) Field of Classification Search .................. 370/304, 370/324, 350, 395.62, 503–521, 252, 445; 714/42
See application file for complete search history.

(56) References Cited

U.S. PATENT DOCUMENTS

| | | | |
|---|---|---|---|
| 4,507,779 A | * | 3/1985 | Barner et al. ................. 370/505 |
| 6,538,994 B1 | | 3/2003 | Horspool et al. |
| 2001/0044914 A1 | | 11/2001 | Nakano et al. |

OTHER PUBLICATIONS

IEEE Standard 802.3ab-1999, Physical Layer Parameters and Specifications for 1000 Mb/s Operation Over 4-Pair of Category 5 Balanced Copper Cabling, Jul. 26, 1999, The Institute of Electrical and Electronics Engineers, Inc.

* cited by examiner

*Primary Examiner* — Derrick Ferris
*Assistant Examiner* — Mang Yeung

(57) ABSTRACT

A network device including a receiver, a counter, and a trigger. The receiver is configured to receive idle code groups or false carriers from a remote device. The idle code groups indicate that there is no data to be sent from the remote device, and the false carriers indicate a fault. The counter is configured to count the at least one of the idle code groups or the false carriers detected during a predetermined period. The trigger is configured to (i) assert a first signal if the counter exceeds a predetermined threshold during the predetermined period to resynchronize the network device to the remote device and (ii) count a number of times the first signal is asserted without bringing down a link between the network device and the remote device.

20 Claims, 4 Drawing Sheets

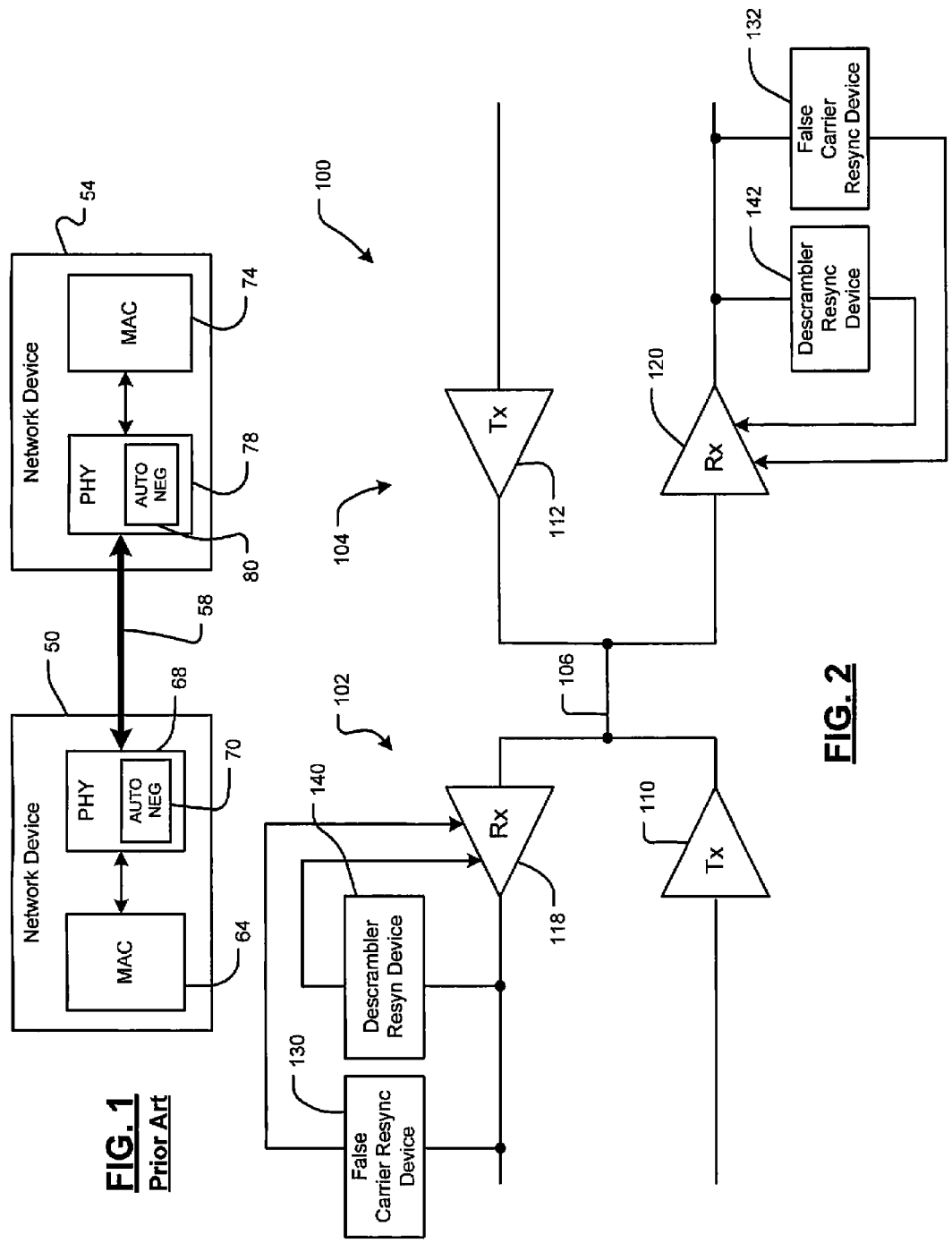

METHODS AND APPARATUS FOR BREAKING AND RESYNCHRONIZING A DATA LINK

CROSS-REFERENCE TO RELATED APPLICATIONS

This application is a continuation of U.S. patent application Ser. No. 10/658,666, filed Sep. 9, 2003, now U.S. Pat. No. 7,706,295, issued Apr. 27, 2010, which is hereby incorporated by reference in its entirety.

FIELD OF THE INVENTION

The present invention relates to network communications, and more particularly to synchronizing communication links between network devices.

BACKGROUND OF THE INVENTION

Referring now to FIG. 1, first and second network devices 50 and 54 communicate over a medium 58. The network device 50 typically includes a medium access control (MAC) device 64 and a physical layer (PHY) device 68. The PHY device 68 may include an autonegotiation circuit 70. The network device 54 also includes a medium access control (MAC) device 74 and a physical layer (PHY) device 78. The PHY device 78 also may include an autonegotiation circuit 80. The medium 58 may be cable that includes two or more twisted pairs of wire.

In general, the network devices 50 and 54 are connected together by the medium 58. Once connected, the physical layer devices 68 and 78 attempt to establish a link so that data can be exchanged. Initially, the network devices 50 and 54 exchange link code words, which contain link parameters that relate to the abilities of the sending network device. Based on the received link parameters, the network devices 50 and 54 attempt to negotiate common link parameters such as link speed. One of the network devices may be designated a master and the other may be designated a slave. A common clock signal may be derived based on signals generated by the master, as will be described further below.

IEEE section 802.3 and 802.3ab, which are both hereby incorporated by reference in their entirety, specify media types and other procedures for establishing links at data rates including 10 Mb/s, 100 Mb/s and 1000 Mb/s. For example, 1000BASE-T supports 1000 Mb/s data rates over four twisted pairs.

A receiver in the PHY devices 68 and 78 uses an scr_status parameter and the state of certain equalization, cancellation, and estimation functions to determine receiver performance quality. A loc_rcvr_status signal is generated to reflect the determined receiver performance quality. The loc_rcvr_status signal is used in the synchronization process between master and slave devices in accordance with FIGS. 40-15 (PHY Control State Diagram) of IEEE Std. 802.3, and is used to generate a 1000BASE-T link in accordance with FIGS. 40-16 (Link Monitor State Diagram) of IEEE Std. 802.3.

One of the devices is designated a "master" device that provides a clock signal that is acquired by the other or "slave" device during link negotiation. Both the master and the slave devices start in a "disable 1000BASE-T transmitter state" upon reset. After link negotiation, the devices enter a "slave silent" state. A signal corresponding to local receive status, i.e., loc_rcvr_status, is forced to a state corresponding to "not OK."

To the master, the "local" receive status refers to the status of the receiver in the master device. To the slave, the "local" receive status refers to the status of the receiver in the slave. A "remote" receiver status for the master refers to the status of the receiver in the slave, while a "remote" receive status for the slave refers to the status of the receiver in the master.

The specification also requires a "min" timer that establishes a predetermined time period. A device returns to the "slave silent state" if, after the predetermined time period, a device is in the "send idle or data state," the local receive status is not OK, and the transmitter of the device is not transmitting. In such a case, the local transmitter is responsive to a signal from the local receiver to transmit zeros, or an equivalent signal.

The master device will proceed directly from the "slave silent state" to a "training state," in which the master device starts transmitting idle code groups via the interconnecting cable to the slave device. These idle code groups comprise code groups recognizable by the slave device as valid code groups. A slave device, on the other hand, remains in the "slave silent" state until it is able to extract scrambler data from the master.

Once the slave device is locked, it asserts "SCR status OK" and enters the "training state." The slave then begins transmitting idle code groups (recognizable to the master as such) while the master is still in the training state. When the slave starts transmitting, the master decodes the idle code groups being sent by the slave. The idle code groups sent by the slave are encoded with symbols that are interpreted as a remote receive status by the master. When the master acquires the scrambler data and decodes the receive status, it goes from a "training state" to a "send idle or data" state, where it remains unless a fault occurs.

At this point, the master has set both the local receive status OK and the remote receive status OK, and can then start sending idle code groups with an encoded remote status, which is decoded by the slave. The slave, which already has local receive status set to OK, then sets the remote receive status to OK and enters the "send idle or data" state. At this point, both the master and slave can start transmitting data that is ready to be sent at the negotiated speed.

Faults can develop in the signal path between the master and slave. For example, the cable or pairs thereof between the master and the slave may break. In this case, the receiver of each network device may receive data from its own transmitter. Other examples of faults may occur because a remote transmitter becomes faulty or a local receiver becomes faulty. In these latter cases, code groups are not properly decoded by the local receiver and the link will go down. When the link goes down, autonegotiation is initiated and the process of establishing a link is repeated. Only after the link has been brought down is any attempt made to resynchronize the link.

SUMMARY OF THE INVENTION

A resynchronization device for an Ethernet network device with a transmitter and a receiver includes a detector that detects faulty code groups received by the receiver. A counter counts the faulty code groups that are detected by the false carrier detector during a predetermined period. A resynchronization trigger asserts a resynchronization signal if the counter exceeds a predetermined threshold during the predetermined period.

In other features, the faulty code groups include false carriers. The false carriers include non-idle code groups other than frame delimiters. Alternately, the faulty code groups include idle code groups that match idle code groups generated by the transmitter of the local network device.

In still other features, the resynchronization signal is a loc_rcvr_status signal. The loc_rcvr_status signal is forced to a first state when the counter exceeds the predetermined threshold during the predetermined period.

In other words, the resynchronization trigger counts a number of times that the resynchronization signal is asserted without bringing down a link. The resynchronization trigger does not assert the resynchronization signal when the resynchronization signal count reaches a predetermined number.

In yet other features, the count of the matching idle code groups is reset when non-matching idle code groups are received.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of network devices that communicate over a medium according to the prior art;

FIG. 2 is a schematic diagram of a communications link between two network devices according to the present invention;

DETAILED DESCRIPTION OF THE PREFERRED EMBODIMENTS

Figure 3:
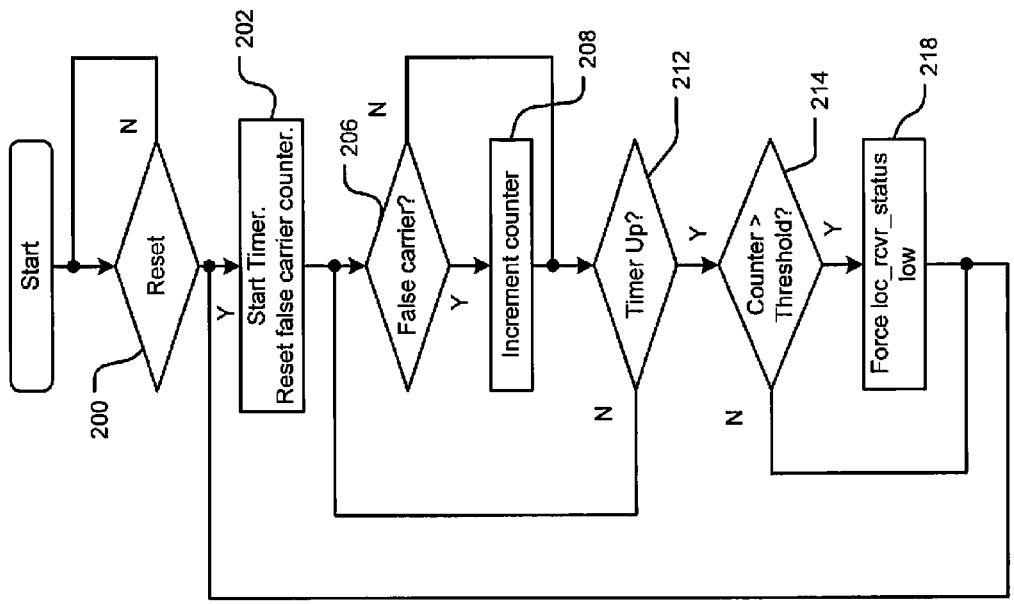
FIG. 3 is a flowchart illustrating steps performed by a false carrier resynchronization device according to the present invention.

The following description of the preferred embodiment(s) is merely exemplary in nature and is in no way intended to limit the invention, its application, or uses.

Referring to FIG. 2, a communication link 100 is established by two network devices 102 and 104 that are connected via a medium 106. The network devices are preferably compliant with IEEE section 802.3ab, which is hereby incorporated by reference in its entirety, and other similar future standards. In other words, the network devices preferably operate at 10, 100 and 1000 Mb/s, although additional, fewer, higher and/or lower data rates may be used. The medium 106 may comprise, for example, four twisted pairs. It is useful at this point to define the terms "local network device" and "remote network device." Each network device is "local" to itself, but "remote" to every other network device in a communication link. When connected to the medium 106 and turned on, the network devices 102 and 104 begin an autonegotiation process to determine link parameters. The link described herein relates to a 1000BASE-T link, although the present invention may also apply to other link speeds. Once the negotiated speed is determined, it is said that the communication link is "up" or "negotiated." The communication link is "down" when no agreement exists as to a common data rate between the network devices 102 and 104 or the data rate is undetermined or is being negotiated or renegotiated. In the case of negotiation or renegotiation, the link is said to be in the process of being "brought up." After the communication link has been brought up, the network devices 102 and 104 synchronize with one another. "Synchronizing with one another" is also referred to herein as "synchronizing the link."

In some configurations, one of the network devices is a "master" that provides a clock signal and the other is a "slave" that recovers this clock signal. Without loss of generality, this discussion assumes that the network device 102 is a master and the network device 104 is a slave. In their respective roles, the master 102 provides a clock signal and the slave 104 recovers the clock signal and transmits it back to the master 102 during synchronization. After synchronization occurs, each of the network devices 102 and 104 transmits idle code groups and/or data to the other via the medium 106. The transmitters 110 and 112 generate signals on the medium 106. Correspondingly, the receivers 118 and 120 receive the signals on the medium 106.

In various configurations of the present invention, the network devices 102 and 104 include a false carrier resynchronization device 130 and 132, respectively. The false carrier resynchronization devices 130 and 132 count false carriers that are received by the associated receiver 118 and/or 120. As used herein, the term false carrier refers to non-idle code groups other than a start of frame delimiter.

In other configurations of the present invention, network devices 102 and 104 include a descrambler resynchronization device 140 and 142, respectively. The descrambler resynchronization devices 140 and 142 increment a counter when the associated receiver 118 and 120, respectively, detects idle code groups that match idle code groups that are generated by the same device's transmitter 110 and 112, respectively, while in idle mode. In other words, the receiver 118 detects the same idle code groups that are sent by the transmitter 110 or the receiver 120 detects the same idle code groups that are sent by the transmitter 112.

Either or both of the master 102 or the slave 104 may transmit incorrect code groups if a fault condition occurs in the transmitter 110 or 112, respectively. For example, incorrect code groups might be transmitted during a time when idle code groups should be transmitted, i.e., when no data is waiting to be transferred. If so, the receiver 118 or 120 in the network device 102 or 104, respectively, interprets the incorrect code groups as a false carrier. Suppose, for example, that transmitter 110 transmits incorrect code groups. The receiver 120 interprets each incorrect code group as a false carrier. The receiver 120 increments counter in the false carrier resynchronization device 132 for each false carrier received. If a predetermined limit is reached, resynchronization is triggered. Advantageously, this resynchronization can occur without dropping the link and having the network devices 102 and 104 autonegotiate to reestablish link parameters such as link speed.

Receiver 120 in network device 104 may determine that a false carrier is present if, for example, there is a flaw in the medium 106, in the remote transmitter 110, if there is a fault in receiver 120 itself, or in case of any combination of these faults. The false carrier will be detected because it is highly unlikely that code groups will be correctly received in any of these situations. Note that in some situations, (e.g., a faulty interconnection 106), both the master 102 and the slave 104 may detect false carrier at the same time, or at essentially the same time.

The false carrier resynchronization device 130 of the slave 104 (and correspondingly, the false carrier resynchronization device 132 of the master 102) counts the number of false carriers detected, i.e., the number of incorrect code groups that are received. In some configurations, the counter is reset after a predetermined time period (e.g., one second), so that resynchronization is attempted only if the predetermined false carrier count is exceeded within the predetermined time period.

More particularly, and referring now to FIG. 3, after being reset as determined at 200, a local network device starts a timer and resets a false carrier counter at 202. The false carrier resynchronization device determines whether a false carrier occurs in step 206 and increments a counter in step 208 if one occurs. When the predetermined interval has expired in step 212, the false carrier resynchronization device determines whether the counter has reached a threshold at 214.

If the threshold has been reached or exceeded, a signal representing local receive status is forced to a state representing "not OK" at step 218. For example, in IEEE standard 802.3 compliant configurations, a "loc_rcvr_status" signal is forced to a state corresponding to "not ok" at step 218. Otherwise, local receive status OK is maintained. In either case, execution of the loop continues with step 202 so that it can be repeatedly determined, at predetermined intervals, whether the counter has reached or exceeded its predetermined limit.

Figure 4:
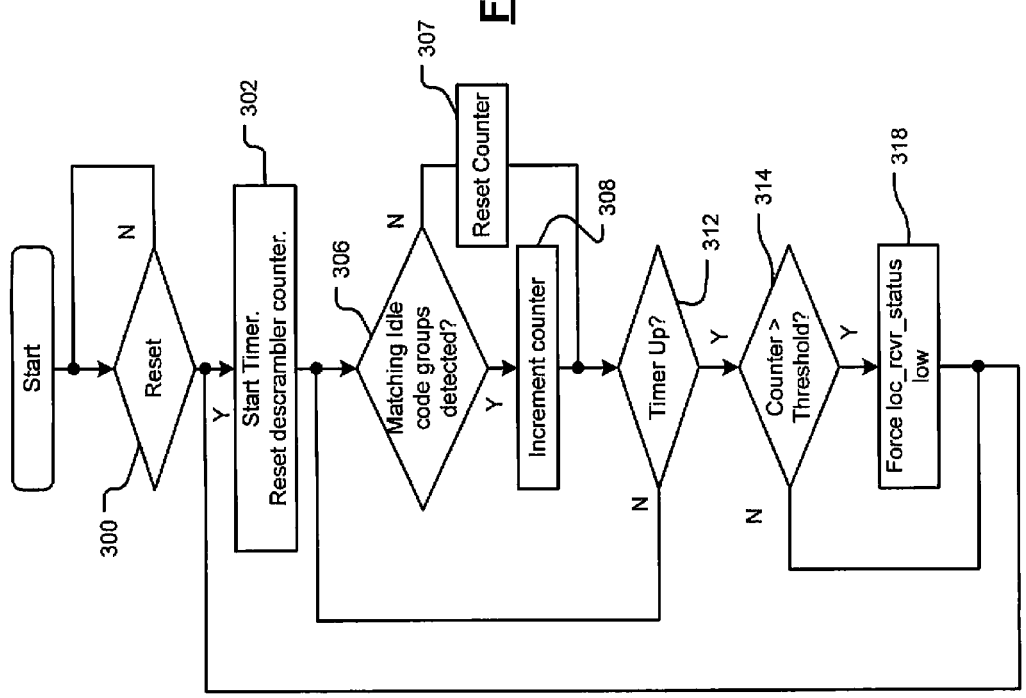
FIG. 4 is a flowchart illustrating steps performed by a descrambler resynchronization device according to the present invention.

Referring now to FIG. 4, after being reset as determined at 300, a local network device starts a timer and clears a descrambler counter at 302. The descrambler resynchronization device determines whether idle code groups that are equal to the code groups sent by the local transmitter occur in step 306. A counter is incremented in step 308 if one occurs. When the predetermined interval has expired in step 312, the descrambler resynchronization device determines whether the counter has reached a threshold at 314.

If the threshold has been reached or exceeded, a signal representing local receive status is forced to a state representing "not OK" at 318. For example, in IEEE Std. 802.3 compliant configurations, "loc_rcvr_status" signal is forced low at step 318. Otherwise, local receive status OK is maintained. In either case, execution of the loop continues with step 302 so that it can be repeatedly determined, at predetermined intervals, whether the counter has reached or exceeded its predetermined limit.

The utility of the descrambler resynchronization device will be appreciated by considering a case in which the medium 106 is disconnected. When the medium 106 is disconnected, hybrids at an end of the medium 106 opposite a local transmitter do not prevent the local receiver from receiving data directly from the local transmitter, which may be transmitting data code groups or idle code groups. The network device may believe that it is still connected to another network device.

When the local receiver receives a certain number of consecutive idles, as determined by a descrambler counter, logic determines that the medium 106 has been disconnected. Some configurations of the present invention attempt a predetermined number of resynchronizations (for example, three) before logic in the local device concludes that the link must be brought down (i.e., renegotiated) to reestablish communication with the remote device. Thus, recovery from temporary fault conditions do not usually require the link to be brought down and autonegotiated.

In some configurations, the false carrier or descrambler count is aggregated from each of the four signal pairs transmitted over medium 106. In this case, even if a fault occurs in only one channel of the link, resynchronization will occur.

The utility of the false carrier counting feature will be appreciated by recognizing that without this feature, a link could hang based solely on probability and randomness of the transmitted data. On the other hand, the use of false carrier and descrambler detectors along with a limit of the number of resynchronizations attempted before autonegotiation is forced ensures that the link will be brought down if the medium 106 is disconnected. With or without the limit on the number of attempted resynchronizations, the false carrier and descrambler counter feature ensures that faults occurring other than in medium 106 advantageously resynchronize the master and slave without necessarily bringing the link down for autonegotation.

Figure 5:
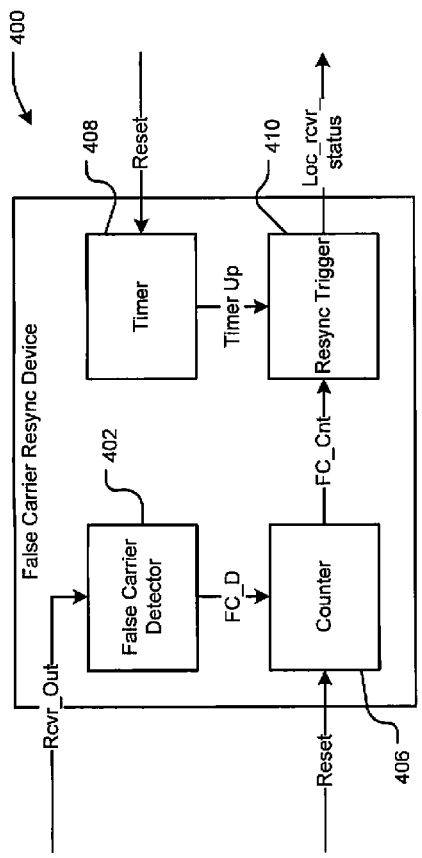
FIG. 5 is a functional block diagram of the false carrier resynchronization device.

Referring now to FIG. 5, a false carrier resynchronization device 400 is shown to include a false carrier detector 402 that receives a Rcvr_out signal. The false carrier detector 402 generates a false carrier detect signal FC_D when a false carrier signal is detected. A counter 406 counts the FC_D events until reset. A timer 408 times the predetermined period. When the predetermined period is up, a resynchronization trigger 410 forces a resynchronization signal to a not OK state if the count is greater than a False carrier threshold. For example, the resynchronization trigger 410 forces the loc_rcvr_status signal low.

Figure 6:
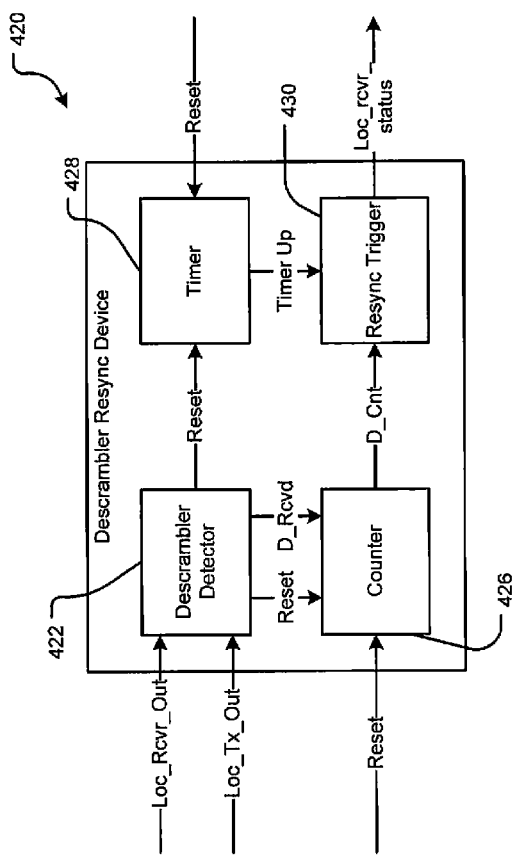
FIG. 6 is a functional block diagram of the descrambler resynchronization device.

Referring now to FIG. 6, a descrambler resynchronization device 420 is shown to include a descrambler detector 422 that receives Rcvr_out and Tx_out signals. The descrambler detector 422 generates a descrambler detect signal (D_Rcvd) when idle code groups output by the local transmitter match received idle code groups. A counter 426 counts the D_Rcvd events until reset. A timer 428 times the predetermined period. When the predetermined period is up, a resynchronization trigger 430 forces a resynchronization signal to a not OK state if the count is greater than a descrambler threshold. For example, the resynchronization trigger 430 forces the loc_rcvr_status signal low. The timer and counter are reset when idle code groups output by the local transmitter do not match received idle code groups.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network device, comprising:
    a receiver configured to receive idle code groups or false carriers from a remote device, wherein the idle code groups indicate that there is no data to be sent from the remote device, and wherein the false carriers indicate a fault;
    a counter configured to count the at least one of the idle code groups or the false carriers detected during a predetermined period; and
    a trigger configured to
        (i) if the counter exceeds a predetermined threshold during the predetermined period, assert a first signal to resynchronize the network device to the remote device, and
        (ii) count a number of times the first signal is asserted without bringing down a link between the network device and the remote device.

2. The network device of claim 1, further comprising:
    a transmitter configured to transmit the idle code groups; and a detector configured to detect the idle code groups during the predetermined period,
wherein the counter is configured to count the idle code groups detected during the predetermined period.

3. The network device of claim 1, wherein:
the receiver is configured to receive faulty code groups; and
the faulty code groups comprise the false carriers, wherein the false carriers (i) include non-idle code groups and (ii) indicate a fault in at least one of the receiver or a transmitter.

4. The network device of claim 3, wherein the receiver is configured to receive faulty code groups, wherein the faulty code groups comprise the idle code groups.

5. The network device of claim 3, wherein the fault is in the receiver.

6. The network device of claim 3, further comprising the transmitter, wherein the fault is in the transmitter.

7. The network device of claim 3, wherein:
the remote device comprises the transmitter; and
the fault is in the transmitter.

8. The network device of claim 1, wherein the predetermined threshold is greater than 1.

9. The network device of claim 1, further comprising a physical layer device configured to renegotiate the link when the number of times exceeds a predetermined number.

10. The network device of claim 1, wherein the false carriers include non-idle code groups other than frame delimiters.

11. The network device of claim 1, wherein the first signal is a status signal indicating a status of the receiver.

12. The network device of claim 11, wherein the status signal is forced to a first state when the counter exceeds the predetermined threshold during the predetermined period.

13. The network device of claim 1, wherein the trigger does not assert the first signal when the count of the number of times the first signal is asserted is equal to a predetermined number.

14. The network device of claim 1, further comprising:
a transmitter; and
a timer configured to time the predetermined period,
wherein the counter is configured to count the number of idle code groups received from the transmitter, and
wherein at least one of the timer or the counter is reset when the idle code groups received by the receiver are different than the idle code groups transmitted by the transmitter.

15. The network device of claim 1, wherein:
the network device is a master device and transmits a clock signal to the remote device to synchronize the network device to the remote device; and
the remote device is a slave device, recovers the clock signal, and transmits the clock signal back to the network device,
wherein the trigger is configured to assert the first signal subsequent to the synchronizing of the remote device to the network device.

16. The network device of claim 15, wherein the master device transmits incorrect code groups to the slave device when a fault condition occurs in at least one of (i) a transmitter of the master device or (ii) a transmitter of the slave device.

17. The network device of claim 1, wherein:
the remote device is a master device, and the network device is a slave device to the master device, wherein
the master device is configured to transmit a clock signal to the slave device; and
the slave device is configured to (i) recover a clock signal transmitted from the master device, and (ii) transmit the clock signal back to the remote device so as to synchronize the slave device to the master device,
wherein the trigger is configured to assert the first signal subsequent to the synchronizing of the slave device to the master device.

18. The network device of claim 17, wherein the master device is configured to transmit incorrect code groups to the slave device when a fault condition occurs in at least one of (i) a transmitter of the master device or (ii) a transmitter of the slave device.

19. A method comprising:
receiving, via a receiver of a network device, idle code groups or false carriers from a remote device, wherein the idle code groups indicate that there is no data to be sent from the remote device, and wherein the false carriers indicate a fault;
counting the at least one of the idle code groups or the false carriers detected during a predetermined period via a counter;
if the counter exceeds a predetermined threshold during the predetermined period, asserting a first signal to resynchronize the network device to the remote device; and
counting a number of times the first signal is asserted without bringing down a link between the network device and the remote device.

20. The method of claim 19, further comprising:
transmitting the idle code groups via a transmitter, wherein the idle code groups are detected and counted during the predetermined period; and
receiving faulty code groups comprising the idle code groups and the false carriers, wherein the false carriers include non-idle code groups and indicate a fault in at least one of the receiver or a transmitter.

* * * * *